(12) United States Patent
Cha et al.

(10) Patent No.: US 7,927,802 B2
(45) Date of Patent: *Apr. 19, 2011

(54) DNA-BASED FUNCTIONALIZATION OF SINGLE WALLED CARBON NANOTUBES FOR DIRECTED ASSEMBLY

(75) Inventors: Jennifer N. Cha, San Jose, CA (US); Christine M. Micheel, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/060,506

(22) Filed: Apr. 1, 2008

(65) Prior Publication Data

US 2011/0057153 A1 Mar. 10, 2011

Related U.S. Application Data

(63) Continuation of application No. 11/846,972, filed on Aug. 29, 2007.

(51) Int. Cl.
*C12Q 1/68* (2006.01)
*C12M 1/36* (2006.01)
*C07H 21/04* (2006.01)

(52) U.S. Cl. ...... 435/6; 435/283.1; 435/287.2; 536/23.1; 977/704; 977/742; 977/746; 977/792

(58) Field of Classification Search .................. None
See application file for complete search history.

(56) References Cited

U.S. PATENT DOCUMENTS

| | | | |
|---|---|---|---|
| 7,129,554 B2 * | 10/2006 | Lieber et al. | 257/414 |
| 2005/0009039 A1 | 1/2005 | Jagota et al. | |
| 2006/0223068 A1 | 10/2006 | Zhang et al. | |

OTHER PUBLICATIONS

Lee et al "Electrically addressable biomolecular functionalization of carbon nanotube and carbon nanofiber electrodes" Nano Letters, 2004, 4 (9):1713-1716.*
Cheung et al "Diameter-controlled synthesis of carbon nanotubes" J. Phys. Chem. B 2002, 106: 2429-2433.*
Appenzeller, J., et al. "Band-to-Band Tunneling in Carbon Nanotube Field-Effect Transistors", (c)2004 The American Physical Society, vol. 93, No. 19, week ending Nov. 5, 2004, pp. 196805-1-196805-4.
Artukovic, E., et al. "Transparent and Flexible Carbon Nanotube Transistors", (c)2005 American Chemical Society; Nano Letters, 2005, vol. 5, No. 4, published on Web Mar. 8, 2005; pp. 757-706.
Auvray, Stephane et al. "Chemical Optimization of Self-Assembled Carbon Nanotube Transistors", (c) 2005 American Chemical Society, Nano Letters, 2005, vol. 5, No. 3, pp. 451-455.

(Continued)

*Primary Examiner* — BJ Forman
(74) *Attorney, Agent, or Firm* — Cantor Colburn LLP

(57) ABSTRACT

Disclosed herein is a method of orienting a carbon nanotube comprising functionalizing a nucleic acid or a carbon nanotube with a plurality of functional groups to form either a functionalized nucleic acid or a functionalized carbon nanotube; disposing a nucleic acid on a functionalized carbon nanotube or a functionalized nucleic acid on a carbon nanotube or a functionalized nucleic acid on a functionalized carbon nanotube to form a nucleic acid-carbon nanotube molecular composite; adsorbing the nucleic acid-carbon nanotube molecular composite upon a substrate; the substrate comprising a plurality of material phases, at least one of which the nucleic acid-carbon nanotube molecular composite has an affinity for; and orienting the nucleic acid-carbon nanotube molecular composite so that it contacts two or more identical material phases.

19 Claims, 5 Drawing Sheets

OTHER PUBLICATIONS

Chen, Zhihong, et al., "An Integrated Logic Circuit Assembled on a Single Carbon Nanotube", www.sciencemag.org, Science, vol. 311, dated Mar. 24, 2006, p. 1735.

Chen, Zhuo et al. "Controllable Interconnection of Single-Walled Carbon Nanotubes under AC Electric Field", (c) 2005 American Chemical Society, J. Phys. Chem. B, vol. 109, No. 23, 2005, pp. 11420-11423.

Chen, Zhuo, et al. "Electric-Field-Enhanced Assembly of Single-Walled Carbon Nanotubes on a Solid Surface" (c) 2005 American Chemical Society, J. Phys. Chem. B 2005, 109, pp. 5473-5477.

Correa-Duarte, Miguel et al. "Alignment of Carbon Nanotubes under Low Magnetic Fields through Attachment of Magnetic Nanoparticles", (c) 2005 American Chemical Society, The Journal of Physical Chemistry B Letters, vol. 109, No. 41, 2005, pp. 19060-19063.

Fan, Fu-Ren F. et al. "Charge Transport through Self-Assembled Monolayers of Compounds of Interest in Molecular Electronics", J. Am. Chem. Soc. vol. 124, No. 19, 2002, pp. 5550-5560.

Gigliotti, Brittany et al. "Sequence-Independent Helical Wrapping of Single-Walled Carbon Nanotubes by Long Genomic DNA", Nano Letters, vol. 6, No. 2, 2006, pp. 159-164.

Hannon, J.B. et al. "Selective Placement of Carbon Nanotubes on Metal-Oxide Surfaces", (c) 2005 American Chemical Society, published on Web Aug. 9, 2005, Langmuir, The ACS Journal of Surfaces and Colloids, dated Sep. 13, 2005, vol. 21, No. 19, pp. 8569-8571.

Hazani, Miron et al. "DNA-mediated self-assembly of carbon nanotube-based electronic devices", www.sciencedirect.com; Chemical Physics Letters 391, (2004) pp. 389-392.

Hazani, Miron et al. "Self-assembled electrical circuits and their electronic properties", Paper; Department of Chemical Physics, Weizmann Institute of Science, Rehovot, 76100 Israel, www.rsc.org/faraday_d, Faraday Discuss., 2006, 131, pp. 325-335.

Hu, Chenguo et al. "DNA Functionalized Single-Walled Carbon Nanotubes for Electrochemical Detection", The Journal of Physical Chemistry B Letters, (c) 2005 American Chemical Society, vol. 109, No. 43, Abstract and pp. 20072-20076.

Im, Jiwoon et al., "'Sliding kinetics' of single-walled carbon nanotubes on self-assembled monlayer patterns: Beyond random adsorption", (c) 2006 American Institute of Physics, The Journal of Chemical Physics, vol. 124, dated 2006, pp. 224707-1-224707-6.

Ismach, Ariel et al., "Orthogonal Self-Assembly of Carbon Nanotube Crossbar Architectures by Simultaneous Graphoepitaxy and Field-Directed Growth", (c) American Chemical Society, Nano Letters, 2006, vol. 6, No. 8, pp. 1706-1710.

Jung, Myung-Sup, et al., "Patterning of Single-Wall Carbon Nanotubes via a Combined Technique (Chemical Anchoring and Photolithography) on Patterned Substrates", (c) 2005 American Chemical Society, J. Phys. Chem. B., vol. 109, No. 21, 2005, pp. 10584-10589.

Keren, Kinneret, et al., "DNA-Templated Carbon Nanotube Field-Effect Transistor", Science, vol. 302, pp. 1380-1382, www.sciencemag.org, Nov. 21, 2003.

Klinke, Christian et al., "Field-Effect Transistors Assembled from Functionalized Carbon Nanotubes" (c) 2006 American Chemical Society, Nano Letters, vol. 6, No. 5, 2006, pp. 906-910.

Kocabas, Coskun et al., "Guided Growth of Large-Scale, Horizontally Aligned Arrays of Single-Walled Carbon Nanotubes and Their Use in Thin-Film Transistors", (c) 2005 Wiley-VCH Verlag GmbH & Co., www.small-journal.com; Small, vol. 1, No. 11, 2005, pp. 1110-1116.

Lu, Jennifer et al., "Generating Suspended Single-Walled Carbon Nanotubes Across a Large Surface Area via Patterning Self-Assembled Catalyst-Containing Block Copolymer Thin Films", (c) 2006 American Chemical Society, The Journal of Physical Chemistry B Letters, vol. 110, No. 22; 2006; published on web May 13, 2006; pp. 10585-10589.

Ma, Yufeng et al., "Enhanced Sensitivity for Biosensors: Multiple Functions of DNA-Wrapped Single-Walled Carbon Nanotubes in Self-Doped Polyaniline Nanocomposites", (c) 2006 American Chemical Society, pubhsed on web Aug. 2, 2006; J. Phys. Chem, B. 2006, vol. 110, cover page, abstract, pp. 16359-16365.

Mclean, Robert S. et al., "Controlled Two-Dimensional Pattern of Spontaneously Aligned Carbon Nanotubes", (c) 2006 American Chemical Society, published on Web Nov. 23, 2005, Nano Letters, 2006, vol. 6, No. 1, pp. 55-60.

Nan, Xiaolin et al., "Immobilizing Shortened Single-Walled Carbon Nanotubes (SWNTs) on Gold Using a Surface Condensation Method", (c) 2002 Elsevier Science, Received Aug. 8, 2001; accepted Oct. 5, 2001, Journal of Colloid and Interface Science 245, pp. 311-318 (2002).

Park, Jang-Ung et al., "In Situ Deposition and Patterning of Single-Walled Carbon Nanotubes by Laminar Flow and Controlled Flocculation in Microfluidic Channels**" (c) 2006 Wiley-VCH Verlag GmbH & Co., Angew. Chem. Int. Ed. 2006, 45, pp. 581-585.

Ranjan, N. et al., "Wrapping carbon nanotubes with DNA: A Theoretical study", XIX International Winterschool/Euroconference on Electronic Properties of Novel Materials, Kirchberg, Tirol, Austria, Mar. 12-19, 2005, American Institute of Physics, AIP Conference Proceedings, vol. 786, cover page and pp. 448-451.

Wang, Tie et al., "Parallel Alignment of Carbon Nanotubes Induced with Inorganic Molecules", published on Web Nov. 11, 2005 (c) 2005 American Chemical Society, Langmuir, 2005, vol. 21, pp. 12068-12071.

Wang, Yuhuang, et al., "Controlling the shape, orientation, and linkage of carbon nanotube features with nano affinity templates", www.pnas.org/cgi/doi/10.1073/pnas.0511022103, PNAS, vol. 103, No. 7,. Feb. 14, 2006, p. 2026-2031.

Weitz, Ralf Thomas, et al., High-Performance Carbon Nanotube Field Effect Transistors with a Thin Gate Dielectric Based on a Self-Assembled Monolayer, published on Web Dec. 21, 2006; (c) 2007 American Chemical Society, Nano Letters, vol. 7, No. 1, 2007, pp. 22-27.

Xin, Huijun et al., "High-yield DNA-templated assembly of surfactant-wrapped carbon nanotubes", Institute of Physics Publishing, Nanotechnology, vol. 16, 2005, pp. 2238-2341.

Xin, Huijun et al., "Directional Orientation of Carbon Nanotubes on Surfaces Using a Gas Flow Cell", published on Web Jul. 1, 2004 (2004) American Chemical Society, Nano Letters, vol. 4, No. 8, 2004, pp. 1481-1484.

Yan, Yehai, et al., "Advances in Carbon-Nanotube Assembly", www.small-journal.com, (c) 2007 Wiley-VCH Verlag GmbH & Co., Small vol. 3, No. 1, 2007, pp. 24-42.

Zheng, Ming, et al., "Structure-Based Carbon Nanotube Sorting by Sequence-Dependent DNA Assembly", Science, vol. 302, Nov. 28, 2003, cover sheet and pp. 1545-1548.

Zhou, Xinjian et al., "Band Structure, Phonon Scattering, and the Performance Limit of Single-Walled Carbon Nanotube Transistors", Physical Review Letters, (c) 2005 The American Physical Society, week ending Sep. 30, 2005, PRL 95, pp. 146805-1-146805-4.

Notice of Allowance mailed Mar. 15, 2010 for U.S. Appl. No. 11/846,972, filed Aug. 29, 2007, Confirmation No. 1374.

Office Action—Non Final for U.S. Appl. No. 11/846,972, filed Aug. 29, 2007, Confirmation No. 1374; Mail Date: Nov. 3, 2009.

* cited by examiner

SEQUENCE LISTING

```
<160> NUMBER OF SEQ ID NOS: 7

<210> SEQ ID NO 1
<211> LENGTH: 50
<212> TYPE: DNA
<213> ORGANISM: Artificial Sequence
<220> FEATURE:
<223> OTHER INFORMATION: PRIMER- bacteriophage lambda

<400> SEQUENCE: 1
tgcagatact cacctgcatc ctgaacccat tgacctccaa ccccgtaata              50

<210> SEQ ID NO 2
<211> LENGTH: 50
<212> TYPE: DNA
<213> ORGANISM: Artificial Sequence
<220> FEATURE:
<223> OTHER INFORMATION: PRIMER- bacteriophage lambda

<400> SEQUENCE: 2
tggtgttgtg tgtgagttcg actggaatga tggaaatggt caggaaggat              50

<210> SEQ ID NO 3
<211> LENGTH: 50
<212> TYPE: DNA
<213> ORGANISM: Artificial Sequence
<220> FEATURE:
<223> OTHER INFORMATION: EXTENDER- bacteriophage lambda

<400> SEQUENCE: 3
tatgcattta agtcgcttga aattgctata agcagagcat gttgcgccag              50

<210> SEQ ID NO 4
<211> LENGTH: 56
<212> TYPE: DNA
<213> ORGANISM: Artificial Sequence
<220> FEATURE:
<223> OTHER INFORMATION: EXTENDER- bacteriophage lambda
```

-continued

```
<400> SEQUENCE: 4
cagagtctga ccagaaatta ttaatctggt gaagttgaag tttttcctct gtcatt          56

<210> SEQ ID NO 5
<211> LENGTH: 100
<212> TYPE: DNA
<213> ORGANISM: Artificial Sequence
<220> FEATURE:
<223> OTHER INFORMATION: TEMPLATE- bacteriophage lambda

<400> SEQUENCE: 5
ctggcgcaac atgctctgct tatagcaatt tcaagcgact taaatgcata tggtgttgtg     60
tgtgagttcg actggaatga tggaaatggt caggaaggat                          100

<210> SEQ ID NO 6
<211> LENGTH: 100
<212> TYPE: DNA
<213> ORGANISM: Artificial Sequence
<220> FEATURE:
<223> OTHER INFORMATION: EXTENDER- bacteriophage lambda

<400> SEQUENCE: 6
tatgcattta agtcgcttga aattgctata agcagagcat gttgcgccag catgattaat     60
acagcattta atacagagcc gtgtttattg agtcggtatt                          100

<210> SEQ ID NO 7
<211> LENGTH: 50
<212> TYPE: DNA
<213> ORGANISM: Artificial Sequence
<220> FEATURE:
<223> OTHER INFORMATION: EXTENDER TEMPLATE- bacteriophage lambda

<400> SEQUENCE: 7
attaataatt tctggtcaga ctctgaatac cgactcaata aacacggctc                50
```

DNA-BASED FUNCTIONALIZATION OF SINGLE WALLED CARBON NANOTUBES FOR DIRECTED ASSEMBLY

CROSS-REFERENCE TO RELATED APPLICATIONS

This application is a continuation application of the following co-pending application, which is assigned to the same assignee as this application, International Business Machines Corporation of Armonk, N.Y. The below listed application is hereby incorporated herein by reference in its entirety: U.S. patent application Ser. No. 11/846,972, filed Aug. 29, 2007.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

Carbon nanotubes, including single-walled carbon nanotubes (SWNTs) have been the subject of research since the discovery of carbon nanotubes. Carbon nanotubes possess unique properties such as diameters of about 0.7 to about 500 nanometers (nm) and aspect ratios of about 5 to about 10,000. They are also electrically conducting in which makes them valuable as molecular electrical wires in applications directed to molecular electronics, nanoelectronic components, and field emission displays. Carbon nanotubes may be either multi-walled (MWNT) (e.g., comprising 2 or more concentric layers) or single-walled. Depending on their atomic structure, single wall carbon nanotubes may have either metallic or semiconducting properties, and these properties, in combination with their small dimensions makes them particularly attractive for use in the fabrication of nano-devices. In particular, research is being directed to using single wall carbon nanotubes in field effect transistors.

While carbon nanotubes display a number of advantageous properties, they also possess properties that render it difficult to use them in electronic applications. For example, single wall carbon nanotubes tend to rope as a result of Van der Waal's forces between individual nanotubes. In addition, because of their high aspect ratios, carbon nanotubes tend to agglomerate into bundles that make the dispersion and placement of nanotubes at specific desired locations difficult.

In general, the noncovalent adsorption of carbon nanotubes to organic and inorganic surfaces has, been controlled by modulating the interactions between the entire surface of the nanotube and the desired substrate. For example, carbon nanotubes have been aligned on substrates by flowing gas over a droplet of carbon nanotube suspension. However, despite their potential utility, methods of orienting carbon nanotubes between discrete points, features, or across a series of features on a substrate remain elusive.

It is therefore desirable to develop methods by which carbon nanotubes can be oriented between discrete points or features on a substrate.

SUMMARY OF THE INVENTION

Disclosed herein is a method of orienting a carbon nanotube comprising functionalizing a nucleic acid or a carbon nanotube with a plurality of functional groups to form either a functionalized nucleic acid or a functionalized carbon nanotube; disposing a nucleic acid on a functionalized carbon nanotube or a functionalized nucleic acid on a carbon nanotube or a functionalized nucleic acid on a functionalized carbon nanotube to form a nucleic acid-carbon nanotube molecular composite; adsorbing the nucleic acid-carbon nanotube molecular composite upon a substrate; the substrate comprising a plurality of material phases, at least one of which the nucleic acid-carbon nanotube molecular composite has an affinity for; and orienting the nucleic acid-carbon nanotube molecular composite so that it contacts two or more identical material phases.

Disclosed herein too is a method comprising functionalizing a nucleic acid with a plurality of thiol groups to form a functionalized nucleic acid; disposing the functionalized nucleic acid on a single wall carbon nanotube to form a nucleic acid-carbon nanotube molecular composite; disposing the nucleic acid-carbon nanotube molecular composite upon a substrate that comprises a plurality of material phases; the material phases having a different chemistry from that of the substrate; the disposing being effective to permit the nucleic acid-carbon nanotube molecular composite to contact a material phase.

Disclosed herein too is an article comprising a nucleic acid-carbon nanotube molecular composite in communication with a plurality of material phases; the material phases being disposed upon a substrate; the nucleic acid-carbon nanotube molecular composite comprising a functionalized nucleic acid disposed upon a carbon nanotube; the functionalized nucleic acid comprising a single strand of nucleic acid having functional groups disposed thereon.

DETAILED DESCRIPTION OF THE INVENTION

Figure 1:
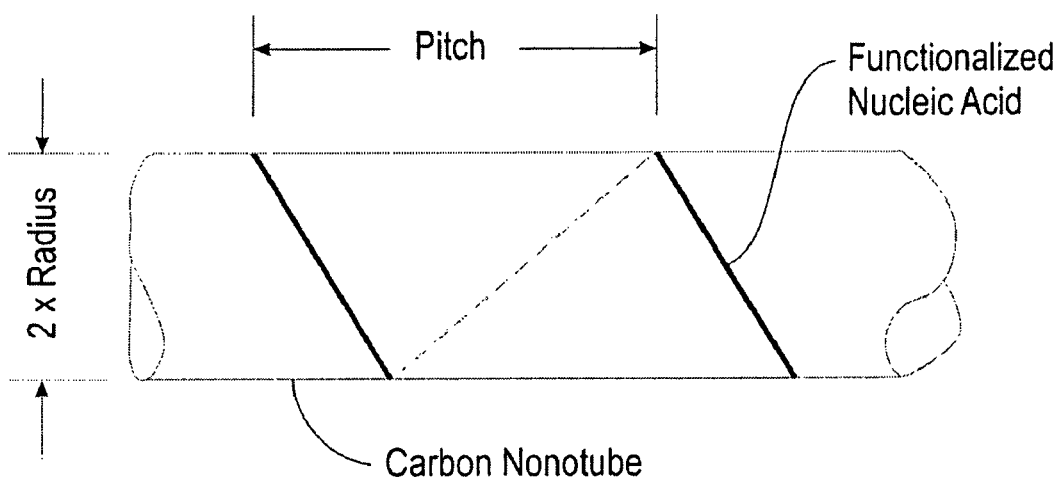
FIG. 1 is an exemplary schematic depiction of a functionalized nucleic acid disposed upon the surface of a carbon nanotube.

The terminology used herein is for the purpose of describing particular embodiments only and is not intended to be limiting of the invention. The terms "a" and "an" do not denote a limitation of quantity, but rather denote the presence of at least one of the referenced item. The term "or" means "and/or". The terms "comprising", "having", "including", and "containing" are to be construed as open-ended terms (i.e., meaning "including, but not limited to").

Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Unless defined otherwise, technical and scientific terms used herein have the same meaning as is commonly understood by one of skill in the art to which this invention belongs.

As used herein a "nucleic acid molecule" is defined as a polymer of RNA, DNA, or peptide nucleic acid (PNA) that is single- or double-stranded, optionally containing synthetic, non-natural or altered nucleotide bases. A nucleic acid molecule in the form of a polymer of DNA may be comprised of one or more segments of cDNA, genomic DNA or synthetic DNA. The letters "A", "G", "T", "C" when referred to in the context of nucleic acids will mean the purine bases adenine ($C_5H_5N_5$) and guanine ($C_5H_5N_5O$) and the pyrimidine bases thymine ($C_5H_6N_2O_2$) and cytosine ($C_4H_5N_3O$), respectively. The term "peptide nucleic acids" refers to a polymer of A, G, T, and C bases where the sugar-phosphate backbone of DNA and RNA has been replaced with a peptide backbone.

Disclosed herein is a nucleic acid-carbon nanotube molecular composite that can be used to selectively bind carbon nanotubes to substrates. Disclosed herein too is a method to produce the nucleic acid-carbon nanotube molecular composite. In one embodiment, the nucleic acid-carbon nanotube molecular composite comprises a functionalized-nucleic acid molecule that is disposed upon and in intimate contact with a carbon nanotube. In one embodiment, the functionalized-nucleic acid molecule is not covalently bonded to the carbon nanotube.

In another embodiment, the nucleic acid-carbon nanotube molecular composite comprises a nucleic acid molecule that is disposed upon and in intimate contact with a functionalized carbon nanotube. In yet another embodiment, the nucleic acid-carbon nanotube molecular composite comprises a functionalized-nucleic acid molecule that is disposed upon and in intimate contact with a functionalized carbon nanotube. The nucleic acid-carbon nanotube molecular composite can be advantageously used to facilitate selective binding between the carbon nanotube with given sites on a substrate. The substrate generally comprises a plurality of phases, at least one of which the nucleic acid-carbon nanotube molecular composite has an affinity for. The affinity of the nucleic acid-carbon nanotube molecular composite for a particular phase on the substrate facilitates orientation of the nucleic acid-carbon nanotube molecular composite on the substrate.

In one embodiment, the spacing between the functional groups on the nucleic acid and the diameter of the carbon nanotube upon which the functionalized nucleic acid is disposed can be correlated with the distance between the phases on the substrate that the nucleic acid-carbon nanotube molecular composite has affinity for. This correlation permits the design of substrates and corresponding nucleic acid-carbon nanotube molecular composites that can be used together to form molecular electrical circuits.

The carbon nanotubes can be single wall carbon nanotubes or multiwall carbon nanotubes. Single wall carbon nanotubes used in the composition may be produced by laser-evaporation of graphite or carbon arc synthesis. Single wall carbon nanotubes generally have a single wall with an outer diameter of about 0.7 to about 3.0 nanometers (nm). Single wall carbon nanotubes having aspect ratios of greater than or equal to about 5, specifically greater than or equal to about 100, more specifically greater than or equal to about 1000 are generally utilized in the nucleic acid-carbon nanotube molecular composite. While the single wall carbon nanotubes are generally closed structures having hemispherical caps at each end of the respective tubes, it is envisioned that single wall carbon nanotubes having a single open end or both open ends may also be used. The single wall carbon nanotubes generally comprise a central portion, which is hollow, but may be filled with amorphous carbon.

In one embodiment, the nucleic acid-carbon nanotube molecular composite comprises single wall carbon nanotubes that exist in the form of ropes. These ropes are formed as a result of Van der Waal's forces between the individual carbon nanotubes. The individual nanotubes in the ropes may slide against one another and rearrange themselves within the rope in order to minimize the free energy. Ropes generally having between 2 and $10^5$ nanotubes may be used in the nucleic acid-carbon nanotube molecular composite. Within this range, it is generally desirable to have ropes having greater than or equal to about 100, specifically greater than or equal to about 500 nanotubes. Also desirable are ropes having less than or equal to about 100,000 nanotubes, specifically less than or equal to about 10,000 nanotubes, and more specifically less than or equal to about 5,000 nanotubes. In another embodiment, the nucleic acid-carbon nanotube molecular composite may comprise ropes that comprise a mixture of metallic nanotubes and semi-conducting nanotubes. In an exemplary embodiment, it is desirable for the nucleic acid-carbon nanotube molecular composite to have the nucleic acid disposed upon and in intimate contact with a single single wall carbon nanotube.

In another embodiment, the nucleic acid-carbon nanotube molecular composite can comprise multi-walled carbon nanotubes. These multiwall carbon nanotubes generally have an outer diameter of about 3.5 to about 500 nm. Multiwall carbon nanotubes having aspect ratios of greater than or equal to about 5, specifically greater than or equal to about 100, more specifically greater than or equal to about 1000 are generally utilized in the nucleic acid-carbon nanotube molecular composite. The multiwall carbon nanotubes like the single wall carbon nanotubes can be closed structures having hemispherical caps at each end of the respective tubes or can have a single open end or both open ends. The multiwall carbon nanotubes also comprise a central portion, which is hollow, but may be filled with amorphous carbon.

In one embodiment, it is desirable for the carbon nanotubes to have a narrow distribution in diameter sizes. In one embodiment, it is desirable for the carbon nanotubes to have a diameter distribution polydispersity index that is less than about 1.5, specifically less than about 1.3, and more specifically less than about 1.1. In an exemplary embodiment, it is desirable for the distribution in diameter sizes to be monodisperse.

In one embodiment, the nucleic acid-carbon nanotube molecular composite may comprise carbon nanotubes with functional groups (substituents). The carbon nanotubes may be functionalized on either a sidewall, a hemispherical endcap or on both the side wall as well as the hemispherical endcap. The carbon nanotubes can be uniformly or non-uniformly substituted. Functionalized carbon nanotubes can have the formula (I)

  (I)

wherein $C_n$ represents the surface carbons of a carbon nanotube. n is an integer, L is a number less than or equal to 0.1 n, m is a number less than 0.5 n, and wherein each of R is the same and is selected from $SO_3H$, COON, $NH_2$, OH, R'CHOH, CHO, CN, COCl, COSH, SH, COOR', SR', $SiR_3'$, Si—$(OR)_y$—$R'_{(3-y)}$, R'', $AlR_2'$, halide, ethylenically unsaturated functionalities, epoxide functionalities, or the like, wherein y is an integer equal to or less than 3, R' is hydrogen, alkyl, aryl, cycloalkyl, or araalkyl, cycloaryl, poly(alkylether), or the like, R'' is fluoroalkyl, fluoroaryl, fluorocycloalkyl, fluoroaralkyl, cycloaryl, X is halide, and Z is a carboxylate or a trifluoroacetate. These compositions are uniform in that each of R is the same. Also included in the invention are functionalized carbon nanotubes having the formula (II)

  (II)

where n, L, m, R' and R have the same meaning as above.

The substituted carbon nanotubes described above may advantageously be further functionalized. Such compositions include compositions of the formula (III)

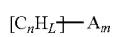  (III)

where the carbons are surface carbons of a carbon nanotube, n, L and m are as described above, A is selected from OY, NHY, —$CR'_2$—OY, N'Y, C'Y,

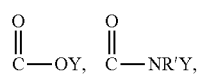

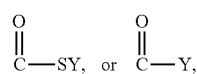

wherein Y is an appropriate functional group of a protein, a peptide, an enzyme, an antibody, a nucleotide, an oligonucleotide, an antigen, or an enzyme substrate, enzyme inhibitor or the transition state analog of an enzyme substrate or is selected from R'OH, $R'NH_2$, R'SH, R'CHO, R'CN, R'X, $R'SiR'_3$, R'Si—(O—$SiR'_2$)—OR', R'—R'', R'—N—CO, $(C_2H_4O)$—Y, —$(C_3H_6O)_w$—H, —$(C_2H_4O)_w$—R', —$(C_3H_6O)_w$—R' and R', wherein w is an integer greater than one and less than 200.

The functional carbon nanotubes having the formula (II) may also be functionalized to produce carbon nanotubes having the formula (IV)

  (IV)

where n, L, m, R' and A are as defined above.

The carbon nanotubes may also have cyclic compounds adsorbed upon their surfaces. Examples of such carbon nanotubes are those having the formula (V)

  (V)

where n, L, m, and R are as defined above, a is zero or a number less than 10, X is a polynuclear aromatic, polyheteronuclear aromatic or an metallopolyheteronuclear aromatic moiety. Exemplary cyclic compounds are planar macrocycles, porphyrins, phthalocyanines.

The adsorbed cyclic compounds may be functionalized. Such compositions include compounds of the formula (VI)

  (VI)

where m, n, L, a, X and A are as defined above and the carbons are on the SWNT.

Functional groups may generally be introduced onto the outer surface of the carbon nanotubes by contacting the carbon nanotubes with a strong oxidizing agent for a period of time sufficient to oxidize the surface of the carbon nanotubes and further contacting the carbon nanotubes with a reactant suitable for adding a functional group to the oxidized surface. Suitable oxidizing agents are comprised of a solution of an alkali metal chlorate in a strong acid. Suitable alkali metal chlorates are sodium chlorate or potassium chlorate. A suitable strong acid used is sulfuric acid. Periods of time sufficient for oxidation are about 0.5 hours to about 24 hours.

The nucleic acid molecules include but are not limited to DNA, RNA and peptide nucleic acids. The nucleic acid molecules may be either single stranded or double stranded and are functionalized at any point with a variety of reactive groups, ligands or agents. In an exemplary embodiment, the nucleic acid molecule is functionalized at its ends. The nucleic acid molecules may be generated by synthetic means or may be isolated from nature by protocols that are known.

It should be noted that functionalization of the nucleic acids are not conducted primarily for their association with carbon nanotubes for purposes of dispersing the carbon nanotubes. Functionalization of the nucleic acids may be conducted after the carbon nanotubes have been dispersed and it is desired to bind other moieties to the nucleic acid or immobilize the nucleic acid-carbon nanotube molecular composite to a surface through various functionalized elements of the nucleic acid.

The nucleic acid molecules may comprise a single base (e.g., poly A and/or poly T) or a plurality of different bases without impairing the ability of the nucleic acid molecule to be disposed upon the carbon nanotube. In an exemplary embodiment, the nucleic acid molecule comprises 2,000 base pairs or more, specifically 3,000 base pairs or more, and more specifically 4,000 base pairs or more.

It is contemplated that ligands may be introduced into the nucleic acid molecules in a variety positional orientations and numbers. For example, ligands can be incorporated into one or both strands of a duplex nucleic acid analyte. Positionally, ligands can be incorporated either at the 5' or 3' ends of the analyte or incorporated on internal bases within the nucleic acid sequence, but incorporation at the 5' or 3' ends is generally desired.

The method of incorporation of the ligand into the nucleic acid sequences may be accomplished either by chemical or enzymatic means, or by direct incorporation of ligand labeled bases into the target sequence. In an exemplary approach, ligand incorporated sequences are prepared using ligand labeled bases or primers during polymerase chain reaction (PCR).

There are several advantages to synthesis of ligand incorporated nucleic acid sequences by PCR. For example, where labeled primers are used, it is possible to control both the positioning and number of ligands within one or both strands of the target sequence by the appropriate placement of the ligand in the primers.

Examples of ligands and functional groups that may be ligated to the nucleic acid sequences are alkene, alkyne, alkyl halide (or haloalkane), alcohol, aldehyde; ketone, carboxylic acid, acyl chloride (or acid chloride), ester, ether, amine, sulfide, thiol, or the like, or a combination comprising at least one of the foregoing functional groups. An exemplary functional group is a thiol. It is generally desirable for the thiol to be ligated to the 5' or 3' ends of the nucleic acid.

Details of manufacturing the nucleic acid-carbon nanotube molecular composite comprising a thiol functionality are provided in the example below.

Once the functionalized nucleic acid molecules have been prepared it is desirable for them to be stabilized in a suitable solution to form a stabilized functionalized nucleic acid solution. It is desirable for the nucleic acid molecules to be in a relaxed secondary conformation and only loosely associated with each other to allow for the greatest contact by individual strands with the carbon nanotubes. Stabilized solutions of nucleic acids generally include salts and buffers. Examples of such buffers are sodium and potassium salts, and TRIS (Tris (2-aminoethyl)amine), HEPES (N-(2-hydroxyethyl)piperazine-N'-(2-ethanesulfonic acid), and MES (2-(N-Morpholino)ethanesulfonic acid. Solvents for stabilizing the functionalized nucleic acids solutions generally include water miscible solutions. An exemplary solvent is water.

In one embodiment, in one method of manufacturing the nucleic acid-carbon nanotube molecular composite, after the nucleic acid molecules are stabilized in a suitable solution they may be contacted with a population of bundled carbon nanotubes. The contacting may be done in the presence of an agitation means of some sort.

Agitation may involve the use of shear force, extensional force, compressive force, ultrasonic energy, electromagnetic energy, thermal energy or combinations comprising at least one of the foregoing forces or forms of energy, and may be conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Agitation involving the aforementioned forces may be conducted in machines such as single or multiple screw extruders, Buss kneaders, Henschel mixers, helicones, Ross mixers, Banbury, roll mills, ultrasound sonicators, molding machines such as injection molding machines, vacuum forming machines, blow molding machines, or the like, or a combination comprising at least one of the foregoing machines.

Upon agitation, the carbon nanotubes will become dispersed and will form the nucleic acid-carbon nanotube molecular composite comprising a nucleic acid molecule loosely associated with a carbon nanotube by pi-stacking, hydrogen bonding or some non-covalent means.

The process of agitation and dispersion may be improved with the optional addition of nucleic acid denaturing substances to the solution. Examples of denaturants are formamide, urea, guanidine, or the like, or a combination comprising at least one of the foregoing denaturants. Additionally temperature during the contacting process will have an effect on the efficacy of the dispersion. Agitation may be conducted at room temperature or higher.

In one embodiment, the functionalized nucleic acid upon being disposed upon the carbon nanotube assumes a helical shape. The pitch between successive helices is dependent upon the diameter of the carbon nanotube. This is demonstrated in FIG. 1.

From FIG. 1, it may be deduced that the arc length or the total length of the functionalized nucleic acid for one turn is represented in the equation (I)

$$\text{Arc length} = [(\text{circumference})^2 + (\text{pitch})^2]^{1/2} \quad (I)$$

where the circumference=$2\pi \times$radius

The total length of the entire functionalized nucleic acid is given in the equation (II)

$$\text{Total length} = \text{Arc length} \times \text{total number of turns} \quad (II)$$

The pitch multiplied by the total number of turns of the functionalized nucleic acid around the carbon nanotube provides a measure of the distance between the functional groups on the carbon nanotubes, when these functionalized groups are disposed at the opposing ends of the nucleic acid molecule. By controlling the length of the nucleic acid and the diameter of the carbon nanotubes upon which the functionalized nucleic acid is disposed, the correlation of the distance between functional groups and the distance between phases on a given substrate for which the nucleic acid-carbon nanotube molecular composite has affinity can be controlled. In this manner, orientation of the nucleic acid-carbon nanotube molecular composite on a given substrate can also be controlled.

The pitch can be about 2 to about 100 nanometers, specifically about 10 to about 90 nanometers, and more specifically about 20 to about 70 nanometers. In one embodiment, the distance between the functional groups is about 1.00 to about 2.00 micrometers, specifically about 1.25 to about 1.75 micrometers, and more specifically about 1.4 to about 1.7 micrometers.

In one embodiment, the non-covalent bonding of the nucleic acid with the carbon nanotubes can be used to disperse the carbon nanotubes, i.e., to minimize the agglomeration or roping of carbon nanotubes In another embodiment, the non-covalent bonding of the nucleic acid with the carbon nanotubes can be used to facilitate orientation of the nucleic acid-carbon nanotube molecular composite on a given substrate. Depending upon the functional group on the nucleic acid-carbon nanotube molecular composite and upon the chemical nature of the substrate, the nucleic acid-carbon nanotube molecular composite can be made to orient in a particular direction on the substrate. In another embodiment, the distance between functional groups (that are covalently bonded to the nucleic acid) on the surface of the carbon nanotubes may be used to orient or to affix the carbon nanotubes between locations on a substrate that are separated by approximately the same distance.

In one embodiment, the distance between the functional groups and the average distance between phases for which the nucleic acid-carbon nanotube molecular composite has affinity can vary by up to about 10%, specifically by up to about 20% and more specifically by up to about 40%. In another embodiment, the distance between the functional groups and the average domain size for which the nucleic acid-carbon nanotube molecular composite has affinity can vary by up to about 10%, specifically by up to about 20% and more specifically by up to about 40%.

The substrate may be an electrically conducting substrate or an electrically insulating substrate. The substrate may comprise a metal, a ceramic, an organic polymer, or a combination comprising at least one of the foregoing substrates.

In one embodiment, the substrate may comprise an electrically insulating ceramic or polymeric base upon which are disposed a plurality of material phases. One of material phases can be electrically conducting while another can be electrically insulating. It is desirable for one of the material phases to be electrically conducting metal islands. Portions of the nucleic acid-carbon nanotube molecular composite can contact the metal islands after being disposed upon the substrate by virtue of the functional groups that are covalently bonded to the nucleic acid. This arrangement can be used to form circuits for the transmission of electricity. In an exemplary embodiment, it is desirable for the nucleic acid-carbon nanotube molecular composite to contact at least two electrically conducting material phases that have a similar chemistry.

In another embodiment, the substrate may comprise an electrically insulating ceramic or polymeric base upon which are disposed electrically conductive islands comprising a mixture of a thermoplastic polymer and a metal. The metal is dispersed within the thermoplastic polymer. When the ends of the nucleic acid-carbon nanotube molecular composite contact the metal islands, the islands can be heated locally to fuse the ends of the nucleic acid-carbon nanotube molecular composite to weld or solder the nanotube to the electrically conductive islands. In one embodiment, after the nucleic acid-carbon nanotube molecular composite contacts desired islands, the nucleic acid can be removed through degradation or etching. Degradation can include thermal degradation, chemical degradation, electromagnetic degradation using electron beams, ultraviolet light, xrays or the like, ion beam degradation, or the like, or a combination comprising at least one of the foregoing forms of degradation. Etching can include the use of chemical etchants, abrasion, or the like.

In an exemplary embodiment, when a nucleic acid-carbon nanotube molecular composite comprising thiol functional groups is dispersed on a substrate comprising gold domains and silicon domains, the nucleic acid-carbon nanotube molecular composite shows a preferential adsorption to the gold domains of the substrate. The ability to adsorb is dependent upon the distance between the thiol groups on the carbon nanotube surface and the distance between the gold domains on the substrate.

The following examples, which are meant to be exemplary, not limiting, illustrate compositions and methods of manufacturing of some of the various embodiments described herein.

EXAMPLES

These examples were conducted to demonstrate that functionalized nucleic acid molecules can bond non-covalently with carbon nanotubes to form nucleic acid-carbon nanotube molecular composites. These examples were also conducted to demonstrate the ability to pattern single wall carbon nanotubes at precise locations on patterned substrates. This example demonstrates that a few functional groups on a nanotube surface can drive selective binding to a selected substrate.

Example 1

This example was conducted to demonstrate the preparation of nucleic acid-carbon nanotube molecular composites. End modified long strands of ssDNA were prepared by the amplification of a 3755 base double-stranded DNA by polymerase chain reaction (PCR) where one of the strands was 5'-thiolated (primer 1-SH) and the other was 5'-phosphorylated (primer 2-PH). PCR was performed using Qiagen PCR Core Kit reagents (Qiagen No. 201225). The procedure was performed according to that described in the Qiagen handbook, Second Edition, March 2006.

The phosphorylated strand of the double stranded 3755-base fragment was digested with lambda exonuclease (Fermantas, No. EN0562). The 3755 base fragment was then extended by ligation to the 3' end of the DNA fragment. For ligation with a 50 base extension, in a polypropylene tube were added 0.1 µM 3755-base single-stranded fragment of DNA; 1 µM Extender SH; 1 µM Template; 5 µl 10× T4 DNA ligase buffer consisting of 50 mM Tris-HCl (pH 7.5), 10 mM MgCl2, 10 mM dithiothreitol, 1 mM ATP, and 25 µg/ml bovine serum albumin; 1 µl T4 DNA Ligase containing 400 Weiss units of enzyme; and distilled water to 50 µl.

For ligation with a 150 base extension, in a polypropylene tube were added 0.1 µM 3755-base single-stranded fragment of DNA; 1 uM 5' Extender Middle, 1 uM Far E-SH. 1 uM Template, 1 uM Extender Middle template; 5 µl 10× T4 DNA ligase buffer consisting of 50 mM Tris-HCl (pH 7.5), 10 mM MgCl2, 10 mM dithiothreitol, 1 mM ATP, and 25 µg/ml bovine serum albumin; 1 µl T4 DNA Ligase containing 400 Weiss units of enzyme; and distilled water to 50 µl.

In addition, a control reaction was run using the above mentioned reagents excepting the ligase but adding 1 µl distilled water.

The reactions were then allowed to stand at room temperature for 24 hours. The DNA was then purified to remove buffer components by dialysis for 48 hours against 4 changes of distilled water (at least 1000:1 volume excess).

The pertinent DNA sequences are:

3794-base sequence: bases 29887 to 33680 in lambda DNA

SEQ ID NO. 1: Primer 1-SH: 5'-HS-TGC AGA TAC TCA CCT GCA TCC TGA ACC CAT TGA CCT CCA ACC CCG TAA TA-3'

SEQ ID NO. 2: Primer 2-Ph: 5'-Ph-TGG TGT TGT GTG TGA GTT CGA CTG GAA TGA TGG AAA TGG TCA GGA AGG AT-3'

SEQ ID NO. 3: Extender SH: 5' Ph-TAT GCA TTT AAG TCG CTT GAA ATT GCT ATA AGC AGA GCA TGT TGC GCC AG-SH 3'

SEQ ID NO. 4: Far Extender-SH: 5'-CAG AGT CTG ACC AGA AAT TAT TAA TCT GGT GAA GTT GAA GTT TTT CCT CTG TCA TT-SH-3'

SEQ ID NO. 5: Template 5'-Ph-CT GGC GCA ACA TGC TCT GCT TAT AGC AAT TTC AAG CGA CTT AAA TGC ATA TGG TGT TGT GTG TGA GTT CGA CTG GAA TGA TGG AAA TGG TCA GGA AGG AT-3'

SEQ ID NO. 6: Extender Middle: 5'-Ph-TAT GCA TTT AAG TCG CTT GAA ATT GCT ATA AGC AGA GCA TGT TGC GCC AGC ATG ATT AAT ACA GCA TTT AAT ACA GAG CCG TGT TTA TTG AGT COG TAT T-3'

SEQ ID NO. 7: Extender Middle template: 5'-Ph-ATT AAT AAT TTC TGG TCA GAC TCT GAA TAC CGA CTC AAT AAA CAC GGC TC-3'

Cohesive-end ligation with T4 DNA ligase, using a 5'-phosphorylated, 100-base template oligonucleotide hybridized to the 50-base extension fragment and 50 bases at the 3' end of the 3755-base lambda DNA fragment, was conducted at room temperature for 4 to 24 hours, specifically 18 hours.

Restriction digests were conducted to confirm ligation. For the digests, the 3755-base fragment extended by 150 bases instead of 50 bases was used for easier visualization of gel bands. Extensions used a 50-base, 3'-thiolated, 5'-phosphorylated oligonucleotide and a 100-base phosphorylated oligo with appropriate template strands to effect cohesive-end ligation. The ligation buffer was removed from the product by dialysis, and restriction was conducted using the single-strand active restriction endonuclease Acc I (NEB, No. R0616S) for 3 hours at 37° C. using Buffer 4 provided by NEB. A control reaction was run without the enzyme.

Figure 2:
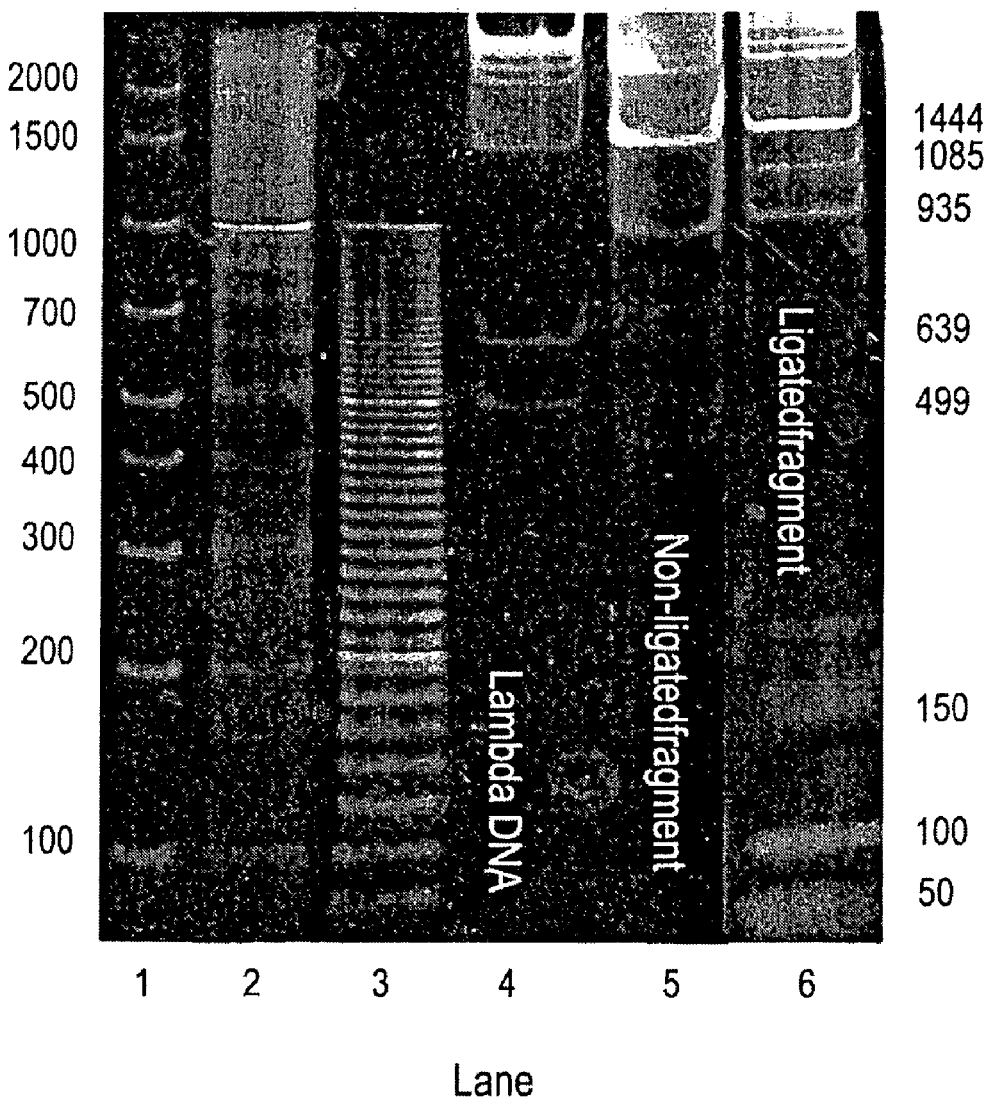
FIG. 2 is an image of a developed polyacrylamide gel of DNA ladders (lanes 1-3), Acc I restriction digests of lambda DNA (lane 4) non-ligated 3755-base DNA (lane 5) and 3755+ 150-base ligated DNA (lane 6), including a band at 1085 bases in lane 6 illustrating successful ligation.

The results were analyzed with polyacrylamide gel electrophoresis on 5% 29:1 acrylamide:methylenebisacrylamide, 1×TBE gels (Bio-Rad, Hercules, Calif.) and were visualized using SYBR II nucleic acid stain (Invitrogen, Carlsbad, Calif.). DNA ladders and a restriction of lambda DNA were run to confirm band assignments, as is illustrated in FIG. 2. FIG. 2 includes a band at 1085 bases in the ligated DNA lane from the extended 935-base fragment. The 935 base fragment is present in both the ligated and non-ligated samples. Without ligation, the 1085-base band would not appear.

Nucleic acid-carbon nanotube molecular composites were prepared by sonicating 10 μg/ml solutions of the ssDNA prepared above in a 4° C. water bath with bulk samples of single wall carbon nanotubes (SWNTs) produced by the HIPCO process. The single wall carbon nanotubes were purchased from Carbon Nanotechnologies Incorporated. Single wall carbon nanotubes that did not disperse were removed by centrifugation. The nucleic acid-carbon nanotube molecular composite obtained by this method were used in the Examples 2-4.

Example 2

Figure 3:
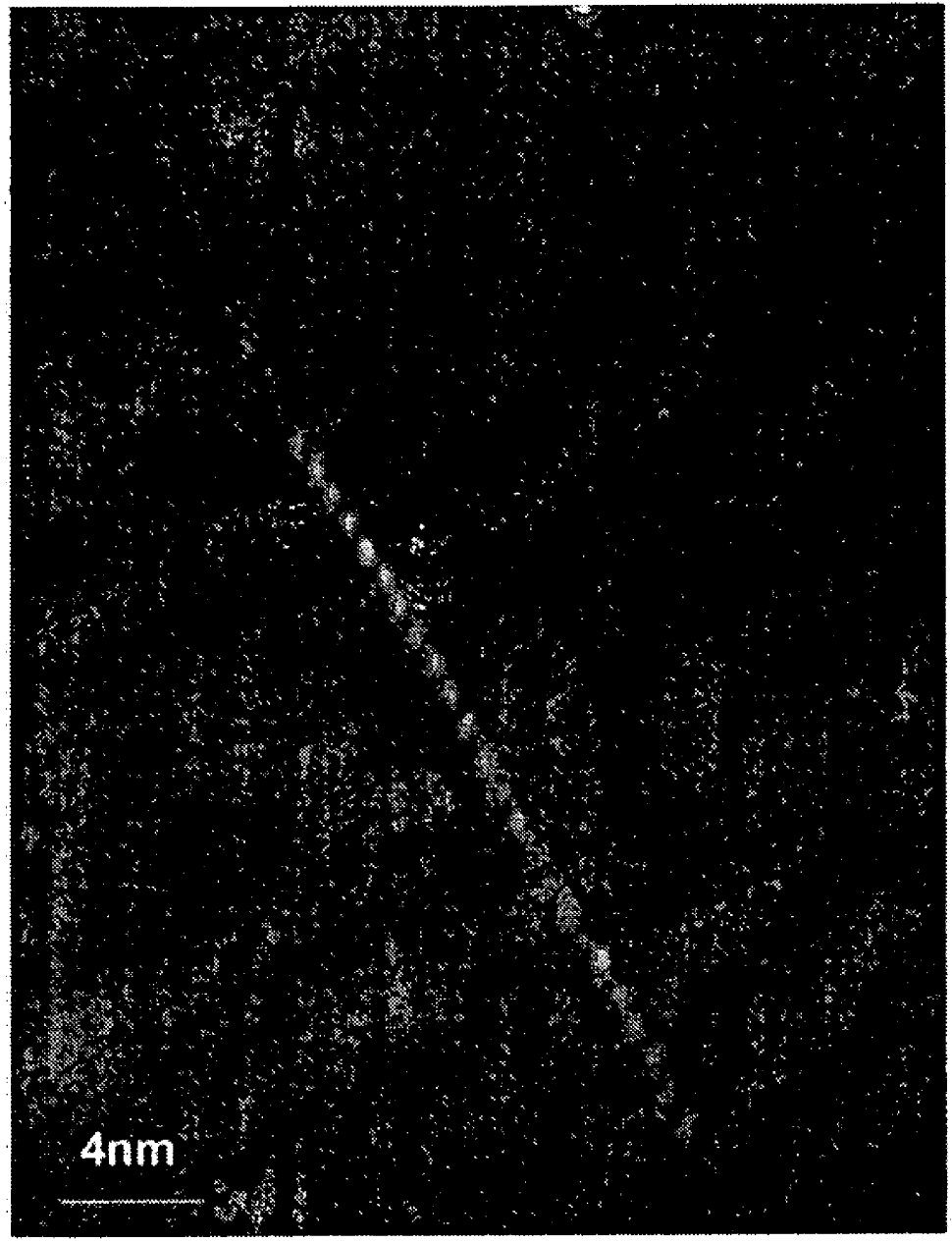
FIG. 3 is an atomic force microscopy (AFM) image of a nucleic acid-carbon nanotube molecular composite comprising a dithiolated single stranded DNA (2SH-ssDNA) wrapped around a single wall carbon nanotube.

This example was conducted to demonstrate that the pitch of a single strand DNA wound around a single wall carbon nanotube can be calculated. Atomic force microscopy (AFM) analysis was performed on nucleic acid-carbon nanotube molecular composites prepared in the Example 1 to determine the periodicity of the ssDNA when wrapped around a single wall carbon nanotube. AFM samples were prepared by drying the supernatant, as prepared in Example 1, on mica and (aminopropyl)triethylsilane (APTES)-treated silicon surfaces. As is illustrated in FIG. 3, AFM analyses of the dithiolated 3805-base nucleic acid-carbon nanotube molecular composites having 2 thiol groups wrapped around a single wall carbon nanotube (2SH-SWNTs) showed periodic structures around the individual nanotubes. After eliminating nanotube bundles by centrifugation at 16,000 g (where g is the unit of the earth's gravitational field. The relative centrifugal field (RCF) is expressed in multiples of g) for one hour, AFM section analyses of the DNA helices around the SWNTs showed an average pitch-to-pitch distance measurement of 25 nm. Approximating the diameter of the nanotube to be 1 nm, the distance between the thiol groups on the nanotube surface was calculated to be 1.62 p.m.

Example 3

Figure 4A:
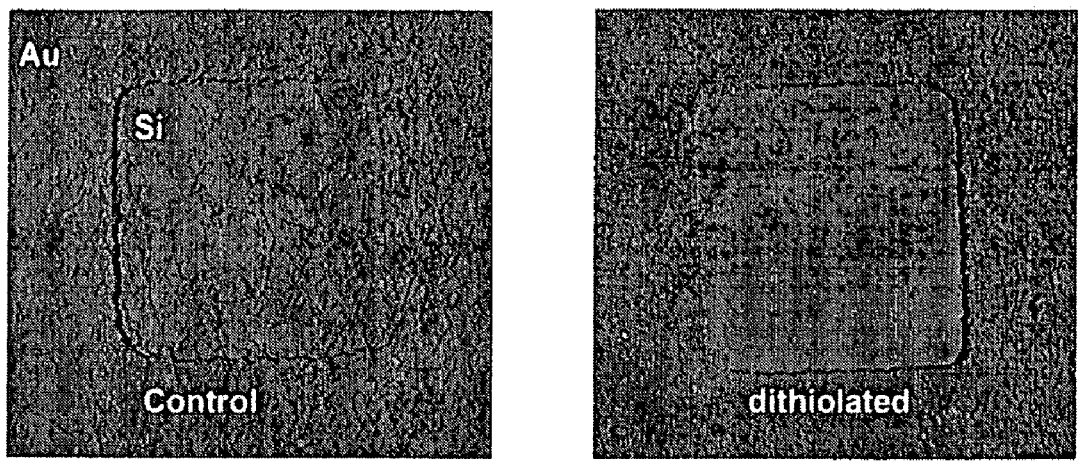
FIG. 4A shows images obtained of nucleic acid-carbon nanotube molecular composites dried on a 2 micrometer×2 micrometer gold and silicon patterns.
Figure 4B:
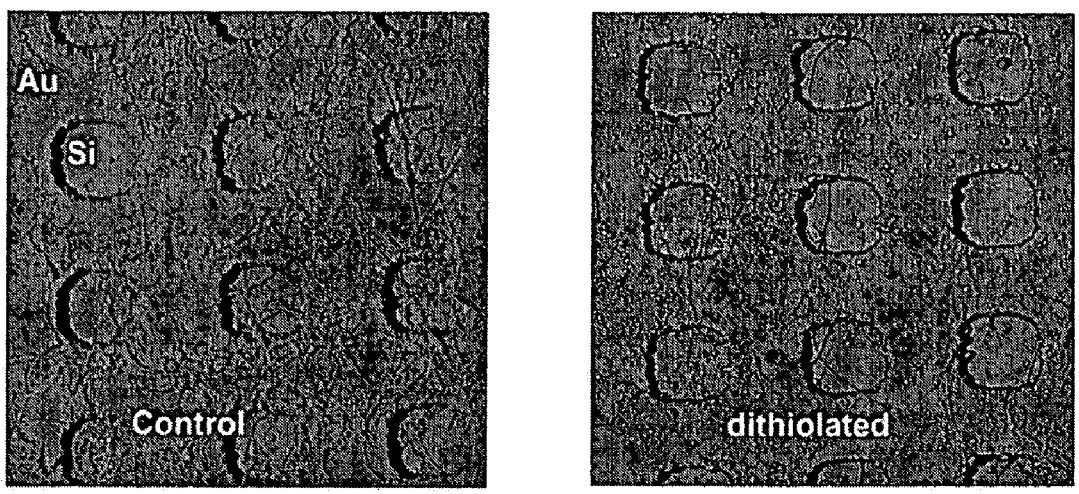
FIG. 4B shows images obtained of nucleic acid-carbon nanotube molecular composites dried on a 650 nanometer× 650 nanometer gold and silicon patterns.

This example was conducted to demonstrate that the nucleic acid-carbon nanotube molecular composite is capable of preferentially bonding to substrates having silicon holes surrounded by gold lines. As can be seen in FIGS. 4A and 4B, the substrate comprised silica holes surrounded by gold lines. The silica holes were substantially square in shape with the sides of the square being either 2 micrometers (μm), 1 μm, 885 nanometers (nm), 650 nm or 400 nm respectively.

The nucleic acid-carbon nanotube molecular composites comprising the 2SH-SWNTs were air-dried on the aforementioned series of line and hole patterns of silicon in gold some of which are shown in FIGS. 4A and 4B. In order to observe the effect of the thiol groups, a comparative sample comprising identical but nonthiolated 3755-base ssDNA was used to disperse single wall carbon nanotubes (0SH-SWNTs), which were also air-dried on the substrate. All of the samples were then sonicated in water for 20 minutes followed by drying under nitrogen. As is shown in FIG. 4A, the control 0SH-SWNTs showed no preference for binding to either the gold or silicon surfaces; this was true irrespective of the size and spacing of the gold patterns used. However, when the 2SH-SWNTs were dried on a pattern of 2 mm×2 mm silicon holes surrounded by gold, the single wall carbon nanotubes adsorbed with high selectivity to the gold surfaces (FIG. 4A, dithiolated) while almost none bound to the silicon surface.

A high degree of selective binding to the gold surfaces was also observed on the 1 μm and 885 nm silicon square patterns although the silicon surfaces were not as pristine and free of single wall carbon nanotubes as on the 2 μm×2 μm patterns. As the sides of the silicon squares were further reduced to 650 nm (FIG. 4B) and 400 nm, the 2SH-SWNTs showed similar behavior to the 0SH-SWNTs, and the single wall carbon nanotubes appeared to bind with equal density to both the silicon and gold surfaces. This example demonstrates that the spacing between the thiol groups on the surface of the carbon nanotubes plays an important role in the selectivity demonstrated by the nucleic acid-carbon nanotube molecular composites. As will be explained below, the distance between the thiol groups on the surface of the carbon nanotube correlates with the size of the silicon square in permitting binding to the gold surfaces.

Example 4

Figure 5:
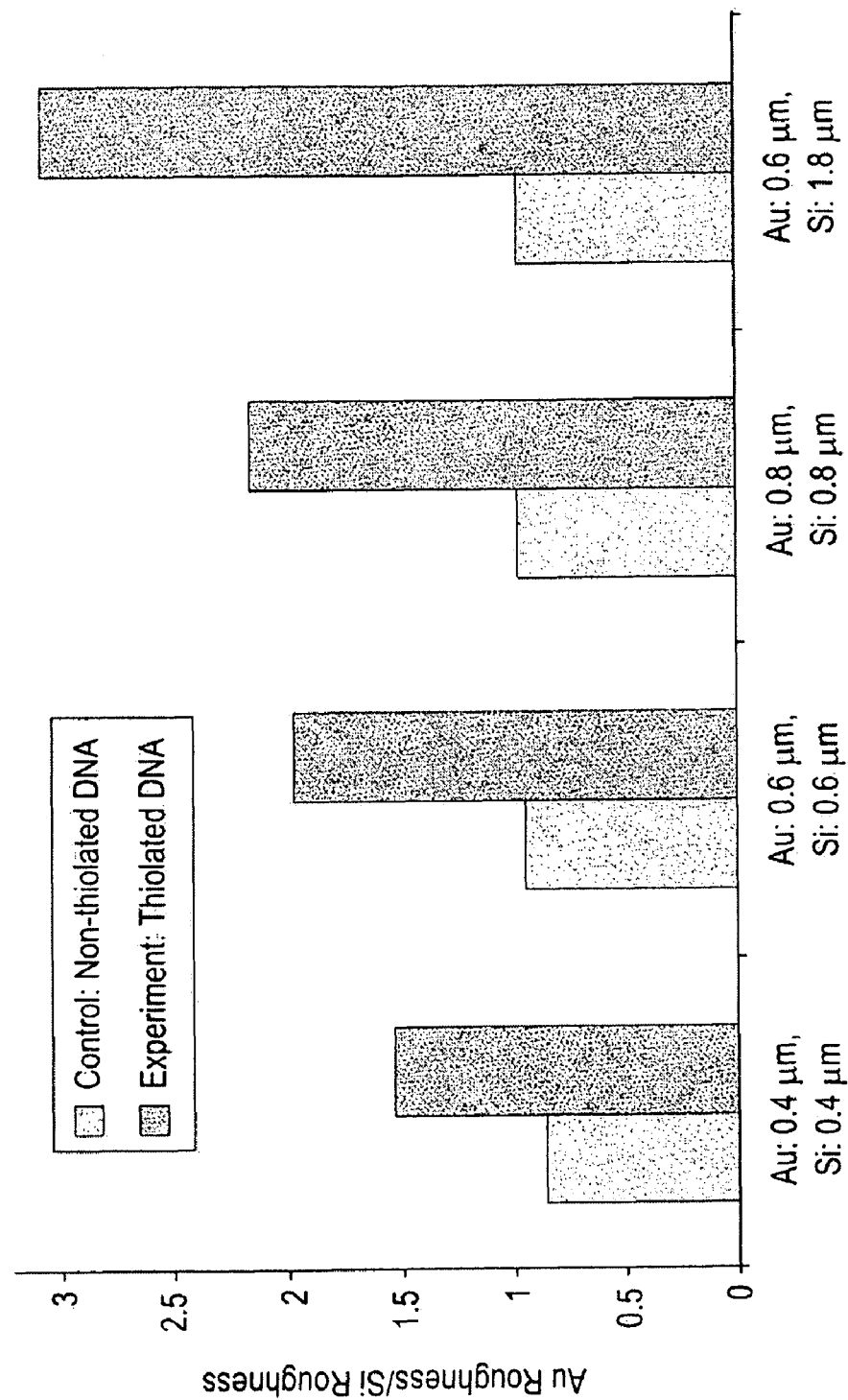
FIG. 5 is a bar graph that depicts the difference in roughness analysis between non-thiolated DNA wrapped single wall carbon nanotubes and nucleic acid-carbon nanotube molecular composite that comprises dithiolated DNA wrapped single wall carbon nanotubes.

This example was conducted to demonstrate the effect of surface roughness on the ability of nucleic acid-carbon nanotube molecular composites to selectively orient on a specific surface. In this example, binding specificity to the gold surfaces was quantified using AFM roughness analysis measurements made of the nucleic acid-carbon nanotube molecular composites dried on the substrate comprising the silicon islands surrounded by gold lines. The results are summarized by the histogram in FIG. 5. Each of the bars shown in FIG. 5 represents the ratio of the roughness recorded on the gold surfaces to that recorded on the silicon surfaces. An increase in the surface roughness is attributed to single wall carbon nanotubes bound to the substrate. All of the roughness ratios obtained with the 0SH-SWNTs gave values of about 1, indicating that the non-thiolated DNA wrapped nanotubes bound with equal preference for gold and silicon. However, the ratios obtained from the nucleic acid-carbon nanotube molecular composites comprising 2SH-SWNTs are all greater than one, indicating a strong preference for binding to the gold surfaces relative to the silicon. Furthermore, the roughness ratios of the 2SH-SWNTs increased with the larger silicon features and gave a maximum Au:Si roughness ratio from the 1.8 µm silicon features which is just slightly longer than the estimated 1.62 µm spacing between the thiol groups as the dithiolated ssDNA wraps around the SWNTs.

The lack of adsorption of the 2SH-SWNTs to the silicon surfaces is unexpected since nonthiolated DNA-wrapped nanotubes did not show any selectivity between gold and silicon substrates. Furthermore, the selective binding to gold is dependent upon the feature size of the silicon patterns and therefore indicates that the selective adsorption to gold is controlled by the distance between the thiol groups exposed on the nanotube surface. The 1.62 µm distance between the two thiol groups explains the lack of single wall carbon nanotube binding to a 2 µm×2 µm silicon area since those dimensions would prevent adjacent thiol groups from binding across a silicon gap to a gold surface. As the combined gold and silicon features scale below 1.6 µm, the selectivity towards gold decreases because the opportunity for a thiol group to find a gold surface increases, even while crossing silicon features.

The aforementioned examples demonstrate the development of a tunable method that allows not only noncovalent sidewall functionalization of single wall carbon nanotubes, but also the ability to control functional group spacing by using dual end-modified long ssDNA. In this instance, a 3805-base dithiolated ssDNA was used to disperse single wall carbon nanotubes to produce nanotubes functionalized with thiol groups spaced 1.62 mm apart. The introduction of just a few functional groups on the nanotube surface permitted selective patterning onto specific surfaces, and was found to depend on the dimensions of the patterned substrates. The work shown here may lead to new techniques for self-assembly of single wall carbon nanotubes between two patterned points on a surface.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of orienting a carbon nanotube comprising:
   forming a functionalized nucleic acid-carbon nanotube composite comprising a plurality of functional groups with a defined spacing between adjacent ones of the plurality of functional groups;
   adsorbing the nucleic acid-carbon nanotube molecular composite upon a substrate; the substrate comprising a plurality of material phases, wherein the plurality of functional groups of the nucleic acid-carbon nanotube molecular composite have an affinity for the plurality of material phases of the substrate, wherein the defined space between the functional groups provides the nucleic acid-carbon nanotube molecular composite with selectivity for selected ones of the material phases, and wherein the defined spacing between adjacent one of the plurality of functional groups differs from an average distance between the plurality of material phases by an amount of up to about 40%; and
   orienting the nucleic acid-carbon nanotube molecular composite so that the functional groups contact two or more identical material phases.

2. The method of claim 1, wherein the nucleic acid comprises a single strand of deoxyribonucleic acid.

3. The method of claim 1, wherein the nucleic acid comprises 2,000 base pairs or more.

4. The method of claim 1, wherein the functional group is a thiol and wherein the defined spacing between functional groups is about 1 to about 2 micrometers.

5. The method of claim 1, wherein the carbon nanotube has a diameter distribution polydispersity index of less than 1.5.

6. The method of claim 1, wherein the substrate comprises gold.

7. The method of claim 1, further comprising bonding the nucleic acid-carbon nanotube molecular composite to the two or more identical material phases.

8. The method of claim 1, further comprising degrading the nucleic acid.

9. An article manufactured by the method of claim 1.

10. A method comprising:
   functionalizing a nucleic acid with a plurality of thiol groups to form a functionalized nucleic acid;
   disposing the functionalized nucleic acid on a single wall carbon nanotube to form a nucleic acid-carbon nanotube molecular composite, wherein the thiol groups are at a defined spacing;
   disposing the nucleic acid-carbon nanotube molecular composite upon a substrate that comprises a plurality of material phases; the material phases having a different chemistry from that of the substrate; the disposing being effective to permit the nucleic acid-carbon nanotube molecular composite to selectively contact a material phase, wherein the defined space between the functional groups provides the nucleic acid-carbon nanotube molecular composite with selectivity for selected ones of the material phases, and wherein the defined spacing between adjacent functional groups differs from an average distance between the plurality of material phases by an amount of up to about 40%.

11. The method of claim 10, further comprising orienting nucleic acid-carbon nanotube molecular composite to contact two or more material phases.

12. The method of claim 10, wherein the phases are electrically conducting, while the substrate is electrically insulating.

13. The method of claim 10, wherein the phases comprise a metal.

14. The method of claim 10, wherein the phases comprise gold.

15. An article manufactured by the method of claim 10.

16. An article comprising:
   a nucleic acid-carbon nanotube molecular composite in communication with a plurality of material phases; the material phases being disposed upon a substrate; the nucleic acid-carbon nanotube molecular composite comprising:
   a functionalized nucleic acid disposed upon a carbon nanotube; the functionalized nucleic acid comprising a single strand of nucleic acid having functional groups disposed thereon, wherein the functional groups provide a defined spacing between the functional groups that provides the nucleic acid-carbon nanotube molecular composite with selectivity for selected ones of the material phases, and wherein the defined spacing between adjacent functional groups differs from an average distance between the plurality of material phases by an amount of up to about 40%.

17. The article of claim 16, wherein the functional groups are thiol groups and wherein the material phases comprise an electrically conducting metal.

18. The article of claim 16, wherein the carbon nanotube is a single wall carbon nanotube.

19. A device comprising the article of claim 16.

* * * * *